Aug. 21, 1928.

W. E. TULLAR 1,681,714

CLUTCH

Filed Sept. 27, 1924

Inventor
William E Tullar
By Wm J Belt
Atty.

Aug. 21, 1928.
W. E. TULLAR
CLUTCH
Filed Sept. 27, 1924
1,681,714
3 Sheets-Sheet 2
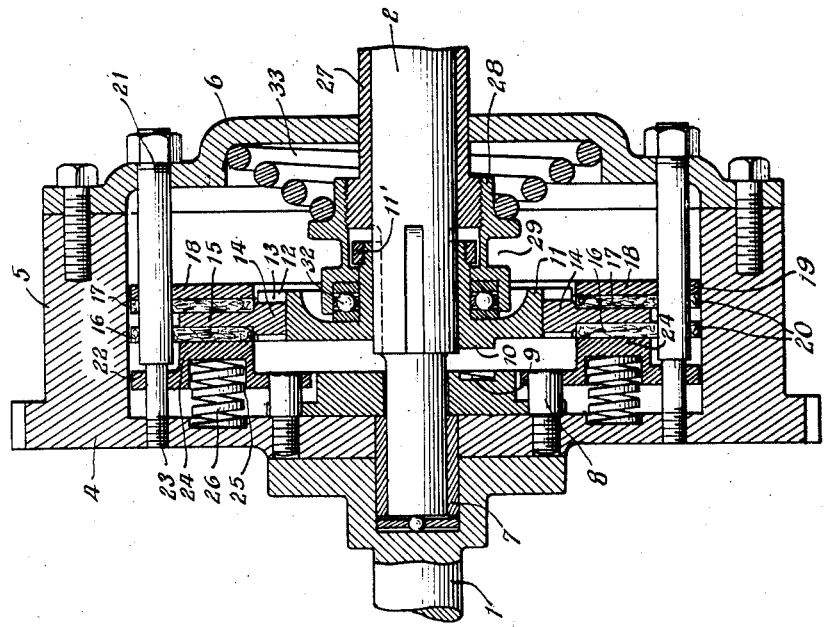
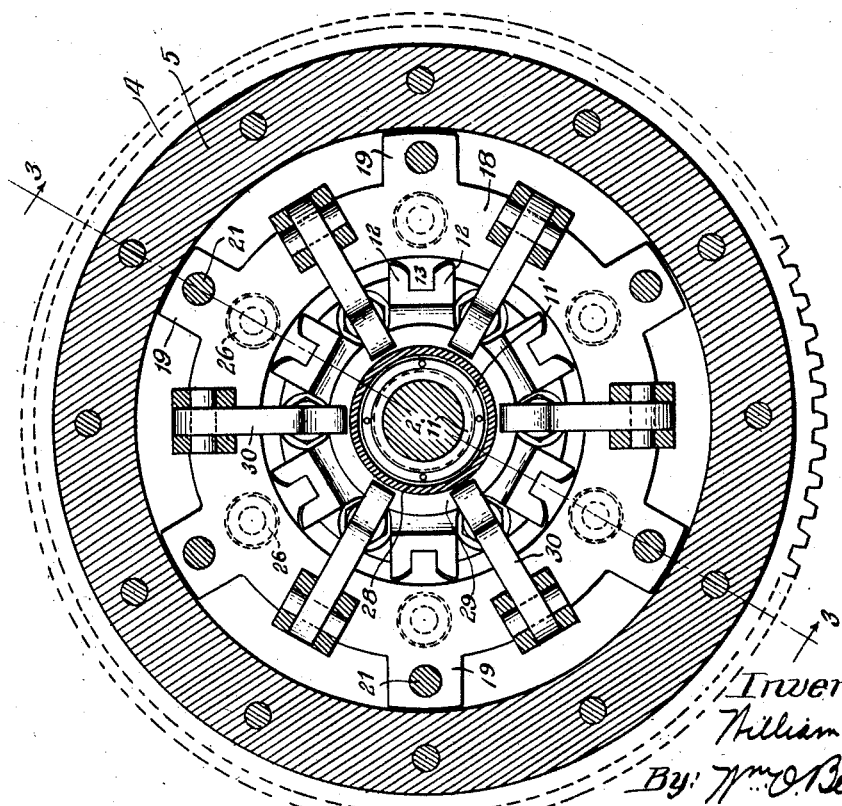

Aug. 21, 1928.

W. E. TULLAR 1,681,714

CLUTCH

Filed Sept. 27, 1924

Inventor:
William E. Tullar
By: Wm. O. Bell
Atty.

Patented Aug. 21, 1928.

1,681,714

UNITED STATES PATENT OFFICE.

WILLIAM E. TULLAR, OF CHICAGO, ILLINOIS.

CLUTCH.

Application filed September 27, 1924. Serial No. 740,241.

In my patent #1,128,079, granted under date of February 9, 1915, I disclosed and claimed a transmission mechanism particularly adapted for use in motor driven vehicles and embodying means for obtaining a plurality of speeds without the necessity of shifting gears. In achieving this result I employed a number of clutches and it is one of the principal objects of my invention to improve upon the construction disclosed in my aforesaid patent by reducing the number of such clutches to one. This object I achieve by providing a novel and improved clutch located in the usual position in an automobile and so designed as to take the place of the plurality of clutches used in the construction disclosed in my aforesaid patent.

A further object of my invention is to provide a novel and improved clutch particularly adapted to operate with my transmission, but also capable of use with other transmissions.

More specifically, an object of my invention is to provide a clutch in which the number and weight of parts revolving with the driven element of the clutch is reduced; in which a positive release of the clutch is effected upon operation of the clutch release lever; and in which a frictional clutching engagement is first obtained followed by a positive engagement between the clutch elements.

In the drawings in which I have shown a selected embodiment of my invention,

Fig. 2 is a section on the line 2—2 of Fig. 1;

Fig. 3 is a section on the line 3—3 of Fig. 2;

Figure 1:
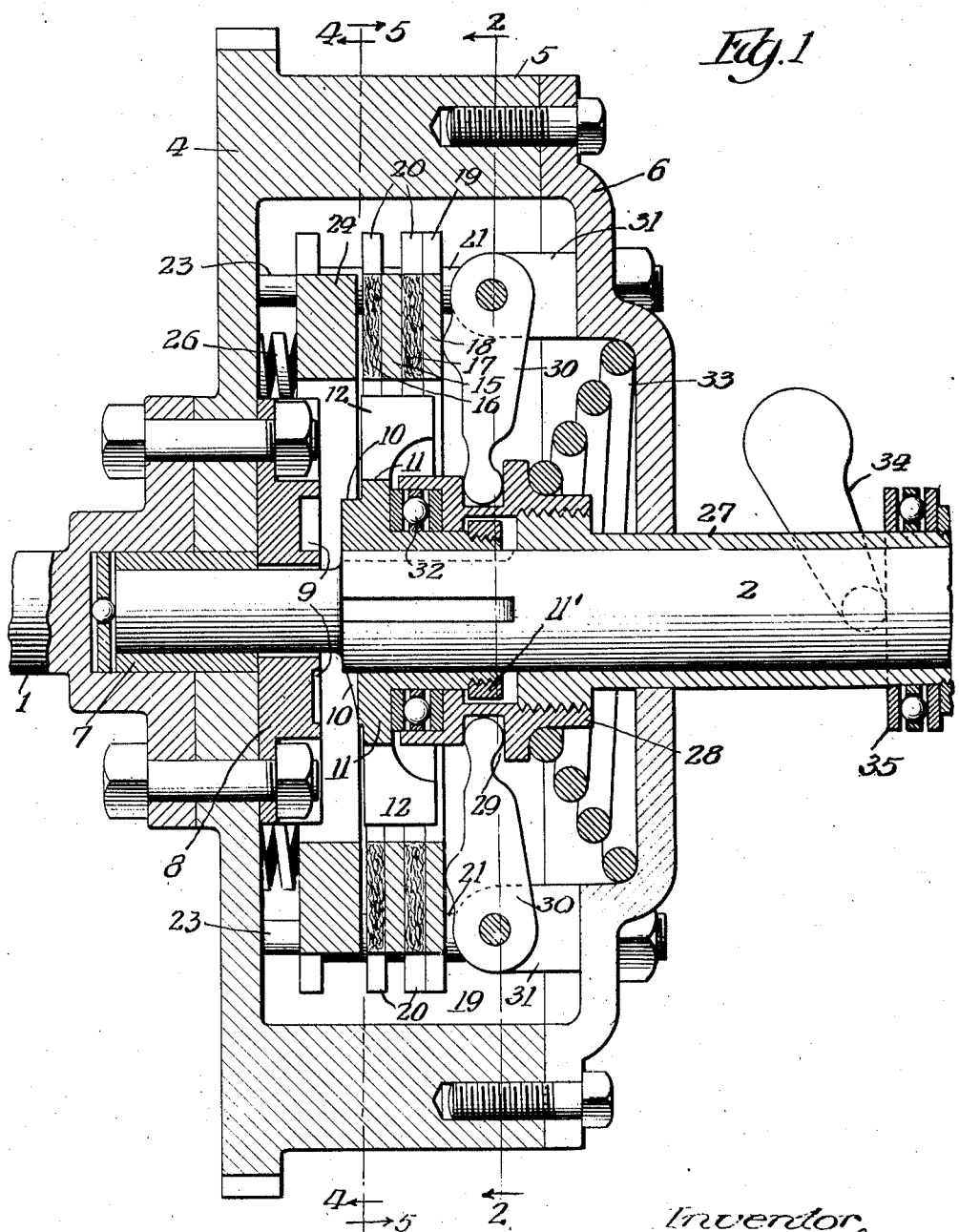
Fig. 1 is a longitudinal sectional view through the clutch of my invention.
Figure 5:
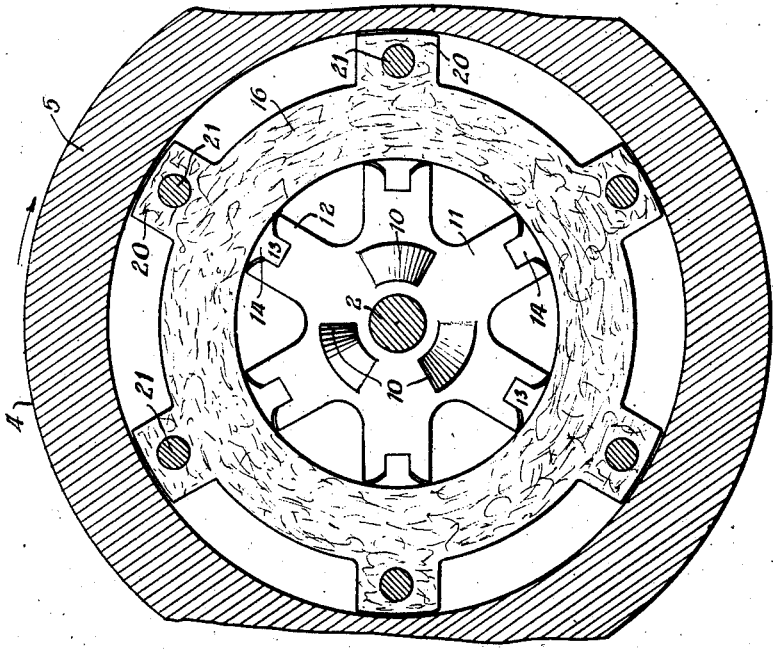
Figure 4:
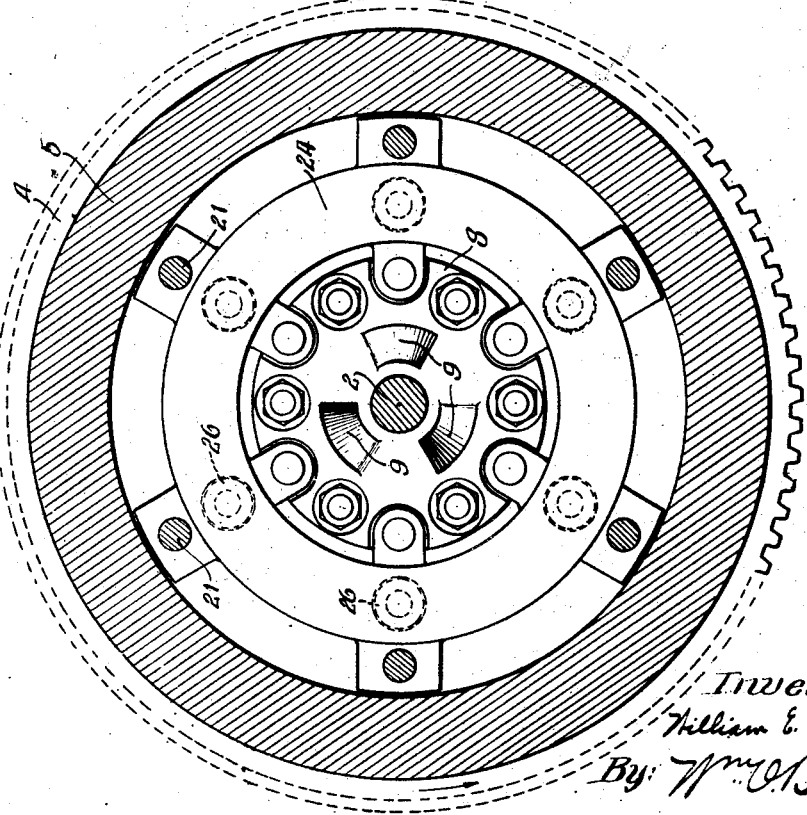
Fig. 4 is a section on the line 4—4 of Fig. 1.

Fig. 5 is a section on the line 5—5 of Fig. 1, it being noted that the lines 4—4 and 5—5 are coincident, the sections on said line shown in Figs. 4 and 5 being taken in opposite directions, as indicated by the arrows.

Referring now to the drawings, the numeral 1 designates a shaft which I choose to term the power shaft, and this shaft may conveniently be the engine shaft of a motor driven vehicle which, through suitable clutch mechanism, imparts movement to a driving shaft 2 which in turn transmits motion to a driven shaft through a suitable change-speed gearing (not shown), this being the usual arrangement in motor driven vehicles. In referring to the clutch, the power shaft 1 is the driving element and the driving shaft 2 is the driven element. These shafts will thus be termed in the claims.

Referring to the drawings, my clutch comprises a flywheel 4 secured to the power shaft 1 by any suitable means, and including an annulus 5 which furnishes a convenient means for securing to the flywheel a cover plate 6, it being understood, of course, that any other suitable means may be used in place of the annulus. The shaft 2 is set within a bearing 7 in the end of the power shaft 1 in a manner well-known in the art, whereby free angular movement between the two shafts is permitted. Secured to the face of the flywheel is a positive clutch element 8 having recesses 9 below the surface of the element 8 and provided with inclined surfaces to register with correspondingly inclined teeth 10 projecting from the surface of a mating clutch element 11 splined upon the shaft 2 and capable of longitudinal movement relative thereto. The element 11 is in the form of a spider having a plurality of legs 12, each of which is bifurcated, as plainly shown in Figs. 2 and 5, as at 13, and in each bifurcation is slidably mounted a lug 14 integral with a ring 15 surrounding the spider. By this means the ring will rotate with the spider but is capable of movement longitudinally with respect to the shafts 1 and 2. On either side of the ring 15 are rings 16 and 17 of suitable friction material. The ring 17 is received between the ring 15 and a second ring 18, it being understood that the rings 15 and 18 are of steel, or the like. The rings 16, 17 and 18 are provided with lugs, as indicated at 19 and 20, in Figs. 2 and 5 to receive pins 21 here shown as bolts threaded into the flywheel 4. By this means the rings are guided.

As will be seen from an inspection of Fig. 3, each bolt 21 is provided with a shoulder 22 which forms a reduced portion 23 adjacent the flywheel and on this reduced portion 23 is suitably mounted a ring 24 provided with a plurality of pockets 25 in which are received compression springs 26. It will be seen that the shoulders 22 furnish means to limit the outward movement of the ring 24 away from the flywheel 4. The surface of the ring 24 opposite the pockets 25 furnishes a friction surface for engagement with the ring 16.

Suitably mounted upon the shaft 2 is a sleeve 27 extending within the enclosure formed by the flywheel and the plate 6 and having within said enclosure a collar 28 provided with a groove 29 within which are received the ends of a plurality of levers 30 pivoted at one end thereof on lugs 31 preferably integral with the plate 6. The collar 28 operates the clutch element 11 through a suitable thrust bearing 32, here shown as a ball bearing, which will permit relative rotation between the elements 28 and 11. The collar 28 is normally urged toward the element 11 by means of the compression spring 33.

Referring particularly to Fig. 1, it will be seen that the sleeve 27 is controlled by a suitable clutch release lever 34 engaging a collar 35 upon the sleeve 27. Operation of this lever to release the clutch will compress the spring 33 and bring the clutch to the position shown in Fig. 1. When it is desired to throw the clutch in, the lever 34 is released and under the action of the spring 33 the clutch element 11 slides on the shaft 2 to the left (Fig. 1). This movement is resisted by the compression springs 26 with increases in force as these springs are compressed. However, the total force exerted by the spring 33 is designed to exceed the total force capable of being exerted by the springs 26. The result is obviously an initial frictional driving connection between the surfaces of the rings 16 and 24 immediately opposite the springs 26 and this frictional driving connection will gradually become firmer as the compression of the springs 26 increases, thereby exerting greater force on the ring 24. Ultimately this force would be nearly sufficient, if not quite sufficient, to furnish a positive driving connection. However, before the springs 26 are fully compressed, the inclined teeth 10 will enter the corresponding recesses 9 until the surfaces of the elements 8 and 11 contact and a positive engagement of the clutch will result, it being understood that the inclined recesses terminate in faces perpendicular to the face of the clutch element 8, and that the teeth 10 have correspondingly perpendicular faces. By this means a clutching engagement may be gradually effected terminating in a positive driving engagement, thereby combining all the advantages of a friction clutch and a positive clutch and further permitting an operative connection between the shafts 1 and 2 to be effected without any sudden engagement of clutching elements with the well-known disadvantages. By forming the recesses 9 below the surface of the element 8 and the teeth 10 projecting from the surface of the element 11 so that when the elements are brought together these two surfaces will contact I make possible a material reduction in the space required, thereby providing a clutch which is substantially more compact than those now in general use.

The springs 26 also act to resiliently urge the clutch element 10 away from the clutch element 8 when the spring 33 is compressed. It will be noted that during normal operation of the parts the ring 24 is not quite against the shoulders 23 on the pins 21 thereby allowing the springs 26 to assist in retracting the clutch element 10 from engagement with the clutch element 8.

In starting with the apparatus in neutral, as shown, the clutch pedal is depressed and the transmission is operated by a gear shift in a manner well known in the art. When the clutch pedal is released the spring 33 will operate to cause engagement of the clutch; first as a friction clutch of varying firmness, and finally as a positive clutch. The clutch can be released at any time to change the speed and upon actuation of the clutch to release the same, a positive release will be caused due to the fact that the springs 26 will cause the levers 30 to move the collar 28 to the right (Fig. 1) carrying with it the clutch element 11 by engagement with the projecting portion 11' on the clutch element 11.

Upon release of the clutch, the rotation of the driving shaft 2 will cease quickly because of the fact that the only parts rotating therewith are the clutch element 11 and whatever gears may be in mesh at the time, and by making the clutch element 11 in the form of a spider I have reduced its weight to a minimum.

From the above it will be apparent that I have devised a clutch which will be most efficient in operation, which will insure a gradual engagement between the driving and driven elements thereof, terminating in a positive engagement, thereby avoiding the sudden jerk or wrench which commonly takes place when a clutch is thrown in, particularly when the transmission is in high, or in any other speed except low.

I am aware that changes in the form, construction and arrangement of parts may be made without departing from the spirit and without sacrificing the advantages of the invention and I reserve the right to make all such changes as fairly fall within the scope of the following claims.

I claim:

1. In a clutch, a driving shaft, a positive clutch element fast thereon, a friction clutch element carried thereby and movable longitudinally thereof, a driven shaft, a positive clutch element splined thereon to co-act with the positive clutch element on said driving shaft, the surfaces of the clutch elements being adapted to be brought into face contact with each other, a friction driving element carried by said driven shaft and movable longitudinally thereof, and a single means to cause engagement first of said friction clutch elements and then of said positive clutch elements.

2. In a clutch, a driving shaft, a positive clutch element fast thereon, a friction clutch element carried thereby and movable longitudinally thereof, a driven shaft, a positive clutch element splined thereon to co-act with the positive clutch element on said driving shaft, a friction driving element carried by said driven shaft and movable longitudinally thereof, and a single means to cause engagement first of said friction clutch elements and then of said positive clutch elements, the friction element carried by said driving shaft being resiliently urged toward said other friction clutch element whereby when said clutch elements are brought together the driving engagement will be gradually increased.

3. In a clutch, a driving shaft, a clutch element secured thereto, a driven shaft, a clutch element splined to said driven shaft, the said clutch elements having surfaces facing one another and adapted to be brought into contact, one of said elements being provided with recesses extending below its surface and the other with corresponding teeth projecting from its surface to enter said recesses and oppositely acting resilient means for urging the clutch elements apart and also into operative engagement, said means being of unequal power.

4. In a clutch, a driving shaft, a clutch element secured thereto, a driven shaft, a clutch element splined to said driven shaft, the said clutch elements having surfaces facing one another and adapted to be brought into contact, one of said elements being provided with recesses extending below its surface and the other with corresponding teeth projecting from its surface to enter said recesses, and means yieldingly urging said elements into engagement and means resiliently urging said elements apart, said two means being of different power.

5. In a clutch, a driving shaft, a clutch element secured thereto, a driven shaft, a clutch element splined to said driven shaft, the said clutch elements having surfaces facing one another and adapted to be brought into contact, one of said elements being provided with recesses extending below its surface and the other with corresponding teeth projecting from its surface to enter said recesses, means yieldingly urging said elements into engagement, and means resiliently urging said elements apart, said first named resilient means being stronger than said second named resilient means.

6. In a clutch a driving shaft, a positive clutch element fast thereon, a friction clutch element carried thereby and movable longitudinally thereof, a driven shaft, a positive clutch element splined thereon to co-act with the positive clutch element on said driving shaft, a friction driving element carried by said driven shaft and movable longitudinally thereof, a plurality of levers carried by said driving shaft, a collar movable on said driven shaft and operating said levers to move said friction driving element, movement of said collar causing engagement first of said friction clutch elements and then of said positive clutch elements.

7. In a clutch a driving shaft, a positive clutch element fast thereon, a friction clutch element carried thereby and movable longitudinally thereof, a driven shaft, a positive clutch element splined thereon to co-act with the positive clutch element on said driving shaft, a friction driving element carried by said driven shaft and movable longitudinally thereof, a plurality of levers carried by said driving shaft, a collar movable on said driven shaft and operating said levers to move said friction driving element, movement of said collar causing engagement first of said friction clutch elements and then of said positive clutch elements, means resiliently urging said clutch elements into engagement, and means resiliently urging said clutch elements out of engagement with a smaller force.

WILLIAM E. TULLAR.